United States Patent [19]

Mori et al.

[11] Patent Number: 4,786,157
[45] Date of Patent: Nov. 22, 1988

[54] ELECTRICALLY OPERATED AUTOMOBILE MIRROR ASSEMBLY

[75] Inventors: Keiji Mori, Kariya; Nozomu Torii, Hekinan, both of Japan

[73] Assignee: Aisin Seiki Kabushiki Kaisha, Japan

[21] Appl. No.: 19,611

[22] Filed: Feb. 27, 1987

[30] Foreign Application Priority Data

Mar. 1, 1986 [JP] Japan .................. 61-42833

[51] Int. Cl.⁴ .................. B60R 1/06; G02B 7/18
[52] U.S. Cl. .................. 350/637; 350/604
[58] Field of Search ......... 350/604, 637, 606, 632, 350/639; 248/900, 549, 475.1, 476, 479, 480

[56] References Cited

U.S. PATENT DOCUMENTS 4,626,083 12/1986 Nakayama et al. ............... 350/604
4,626,084 12/1986 Kumai ............................. 350/604
4,681,409 7/1987 Enomoto .......................... 350/604
4,692,000 9/1987 Wada et al. ...................... 350/604

Primary Examiner—Jon W. Henry
Attorney, Agent, or Firm—Finnegan, Henderson, Farabow, Garrett & Dunner

[57] ABSTRACT

An electrically operated retractable mirror assembly for automobiles, which includes a mirror frame carried by a movable member rotatably mounted on an upright shaft on the automobile body. The shaft on the automobile body has a stationary gear which is in engagement with a rotatable gear mounted on a second shaft. A driving motor is mounted on the movable member and adapted for driving the rotatable gear on the second shaft through a reduction gear mechanism. Between the rotatable gear and the reduction gear mechanism, there is provided a torque limiting mechanism such as a friction mechanism.

10 Claims, 8 Drawing Sheets

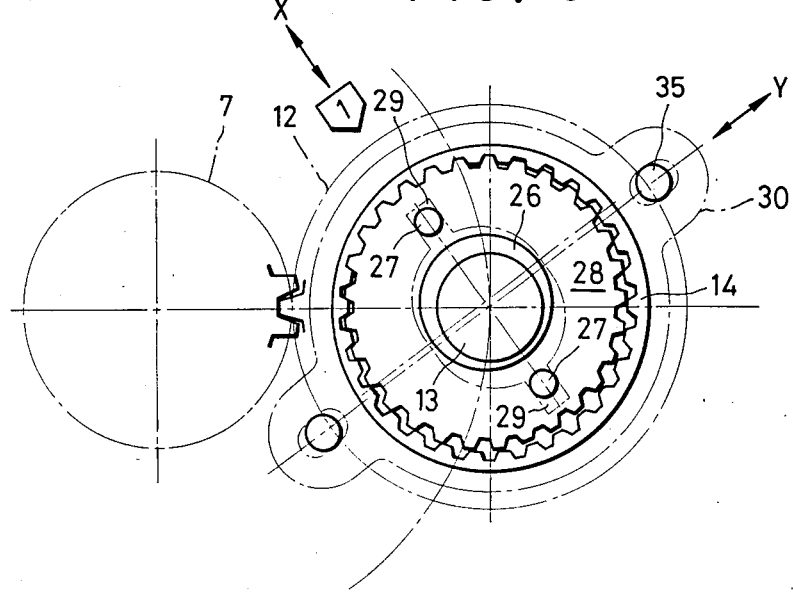
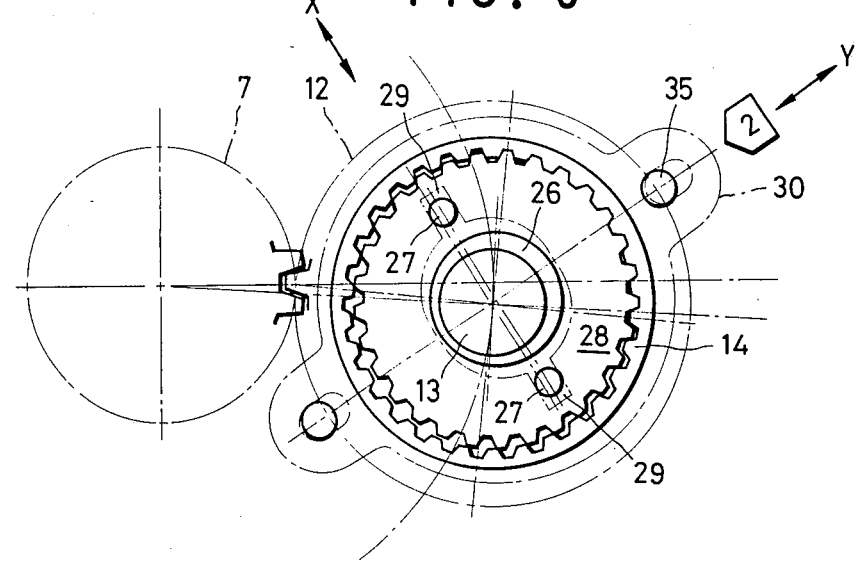

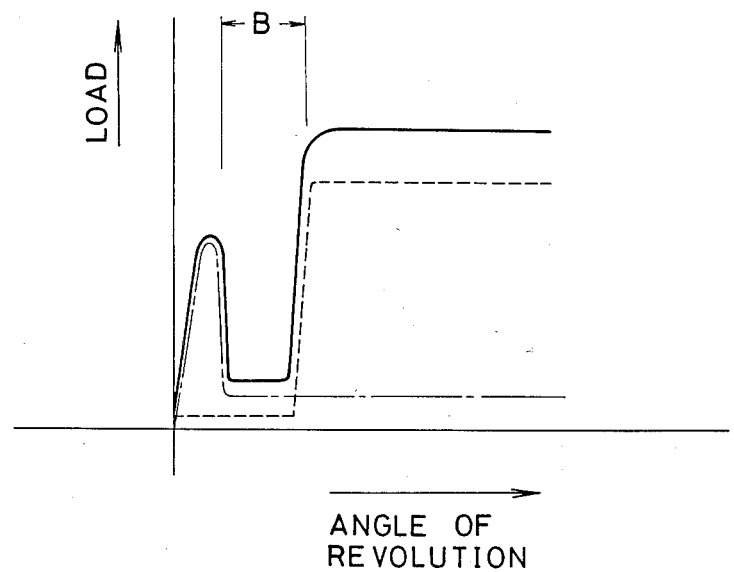

ELECTRICALLY OPERATED AUTOMOBILE MIRROR ASSEMBLY

BACKGROUND OF THE INVENTION

1. Field of the Invention

The present invention relates to an automobile mirror assembly, and more particularly to an electrically operated automobile mirror assembly. More specifically, the present invention pertains to an electrically operated, retractable automobile mirror assembly.

2. Description of the Related Art

In the art of automobile mirrors, such as side mirrors and door mirrors for providing the driver with a rear view, it has been proposed to make the mirrors retractable so that the mirrors are retracted within the contour of the vehicle body or the door assembly when they are not needed. For example, in Japanese utility model application No. 60-149877, which is assigned to the same assignee of the present invention, there is shown an electrically powered automobile mirror assembly which can be retracted by operating the power motor. According to the proposal, the mirror assembly includes, as shown in FIG. 10, a base plate 51 which is secured to a vehicle body 50 and an upright post 52 mounted on the base plate 51. On the post 52, there is rotatably mounted a movable member 53 which carries a rear viewing mirror (not shown). On the movable member 53, there is mounted a power motor 54 which has an output shaft 54a on which a worm 54b is provided. The worm 54b is engaged with an idler gear 55a which is formed integrally with a gear 55. The gear 55 is engaged with a gear 56 which is secured to the post 52. A friction mechanism 57 is provided between the gear 56 and the movable member 53 for preventing a free rotation of the movable member 53. Thus, the movable member 53 is rotated about the post 52 when the motor 54 is energized overcomes the friction force provided by the friction mechanism 57. In order to prevent the mirror assembly from being rotated under an exteral turbulence such as an aerodynamic force to which the mirror is subjected when the vehicle running, it is necessary for the friction mechanism 57 to provide a sufficiently high friction force. It should however be noted that in order to obtain a sufficient friction force, the friction member in the mechanism 57 must be of a large diameter. This is disadvantageous in that the mirror frame dimension must be correspondingly increased. Particularly, in the case where it is required to increase the spacing between the vehicle body 50 and the inner edge 58 of the mirror frame for the purpose of decreasing the aerodynamic force, the increase in the diameter of the friction member is critical. A similar problem is also encountered in the case where the thickness of the mirror frame is to be decreased due to a design requirement. If the diameter of the friction member could be decreased, the axis of the post could be located closer to the vehicle body so that it would be easy to retract the mirror assembly within the outside contour of the vehicle body.

Japanese patent disclosure No. 60-151142 proposes to provide a counter shaft between the motor and the post to provide a further speed reduction gear mechanism. It should however be noted that in this structure the motor must be of a large capacity or of a high performance in order that the motor power can overcome the resistance in the power transmitting gear train. Otherwise, there must be provided a plurality of stages of speed reduction gear mechanisms to thereby decrease the motor capacity. In the case where a plurality of stages of reduction gear mechanisms are provided, there will be an accumulation of the backlash in the gear mechanisms so that there will be a time lag in an operation in the reverse direction or there will be a significant change in the operating force, depending on the angle of rotation as shown in FIG. 11.

SUMMARY OF THE INVENTION

It is therefore an object of the present invention to provide an electrically operated automobile mirror assembly which is compact and smooth in operation.

Another object of the present invention is to provide an electrically operated retractable mirror assembly for an automobile in which the mirror frame can be decreased in dimension.

A still further object of the present invention is to provide an electrically operated, retractable automobile mirror assembly which is substantially free from an abrupt change in the operating force.

According to the present invention, the above and other objects can be accomplished by an electrically operated automobile mirror assembly including a first shaft fixed to an automobile body, a movable member mounted on said first shaft for rotation about said shaft and carrying a reflector, stationary gear means secured to said first shaft, motor means mounted on the movable member and having output means, means for connecting said output means of the motor means through the stationary gear with said movable member, the connecting means including speed reduction gear means and friction means, the reduction gear means including a rotatable gear mounted on a second shaft provided on the movable member, the rotatable gear being in meshing engagement with the stationary gear on the first shaft, a planetary gear unit having a first element connected with the output means of the motor means and a second element engaged through the friction means with the rotatable gear. According to a feature of the present invention, the stationary gear on the first shaft can be decreased in diameter so that it is possible to decrease the mirror frame without difficulty.

The above and other objects and features of the present invention will become apparent from the following descriptions of preferred embodiments taking reference to the accompanying drawings.

BRIEF DESCRIPTION OF THE DRAWINGS

FIGS. 5 through 8 show operations of the planetary gear mechanism;

DESCRIPTION OF THE PREFERRED EMBODIMENTS

Figure 1:
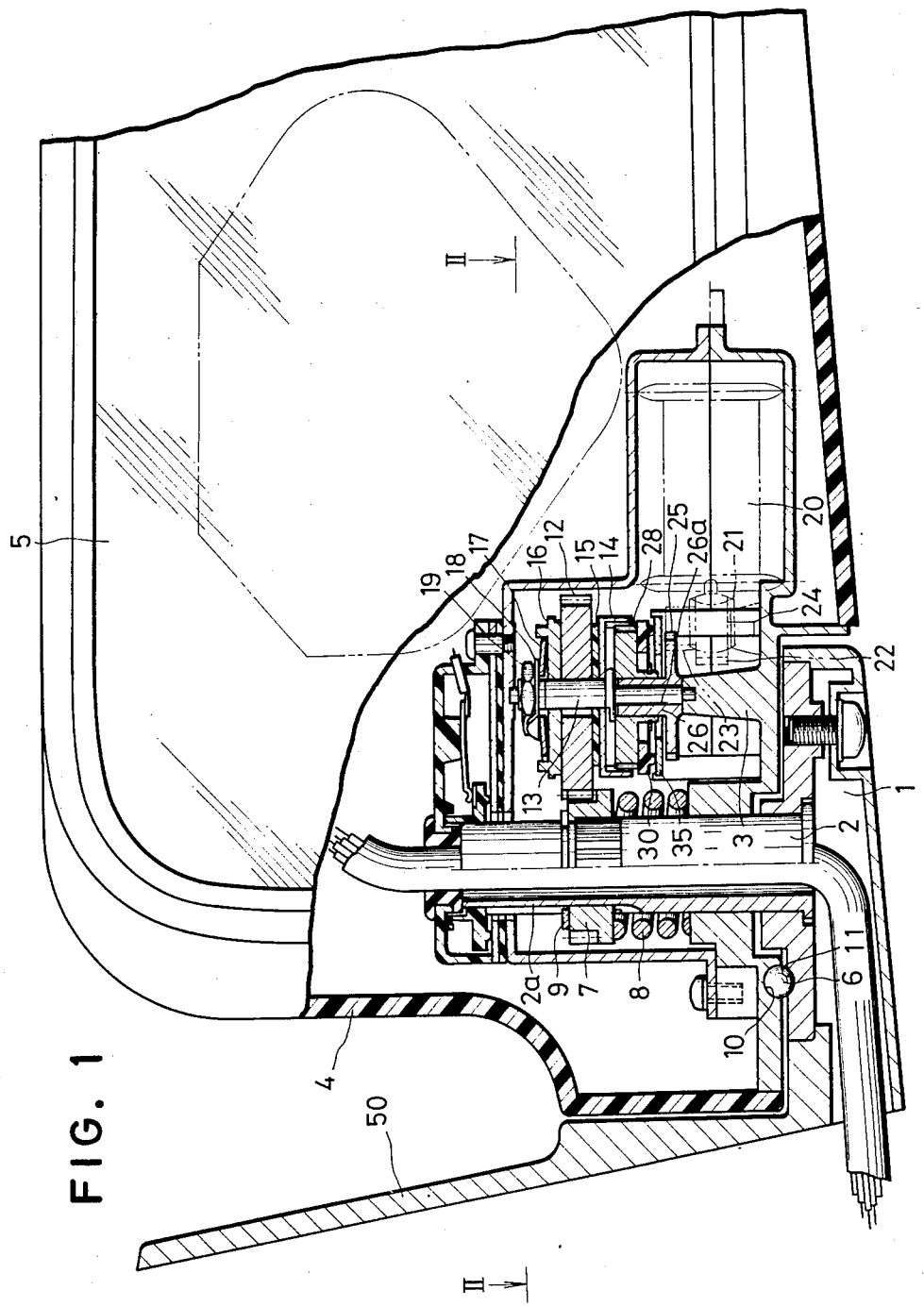
FIG. 1 is a partially sectioned front view of an electrically operated retractable mirror assembly in accordance with one embodiment of the present invention.
Figure 2:
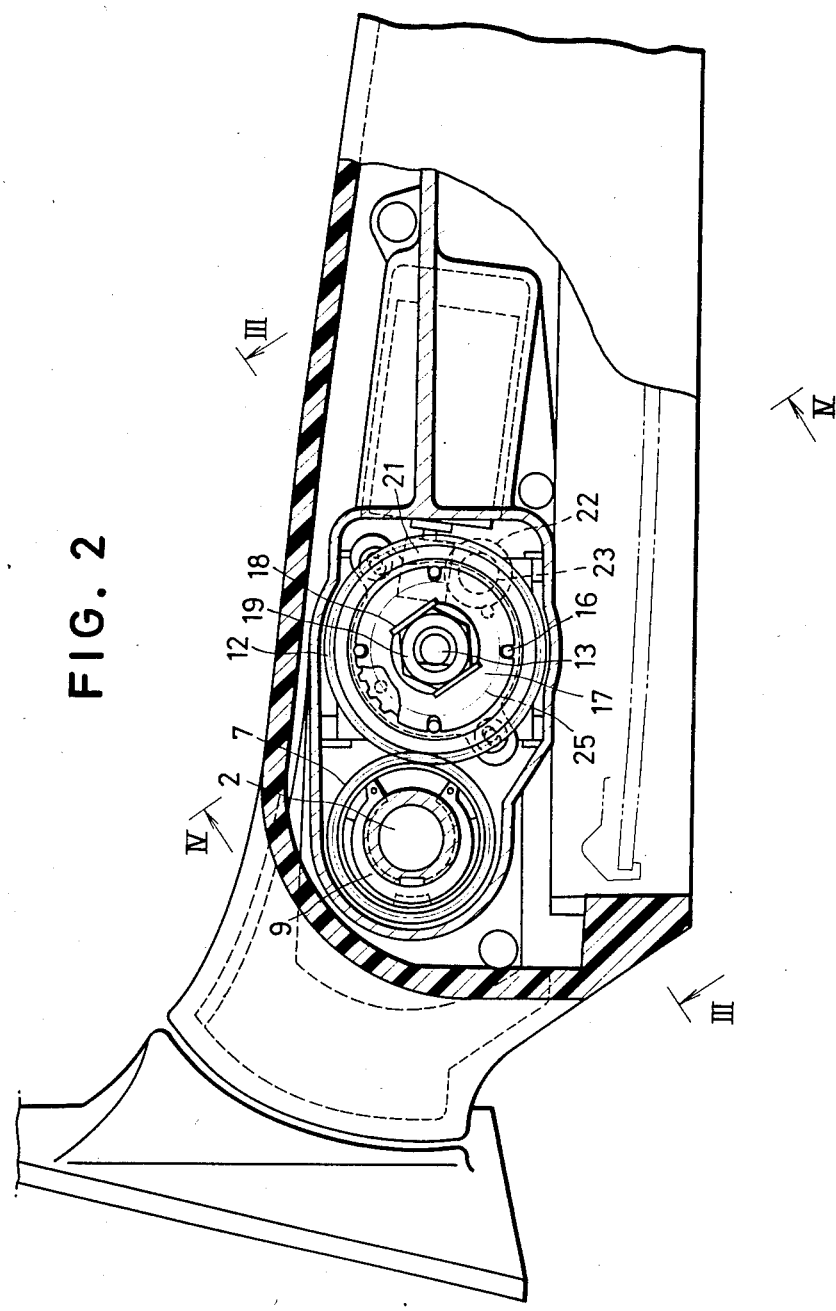
FIG. 2 is a sectional view taken substantially along the line II—II in FIG. 1.

Referring to the drawings, particularly to FIGS. 1 through 4, there is shown an electrically operated, retractable mirror assembly including a base plate 1 which is secured to an automobile body 50. An upright shaft 2 is secured to the base plate 1 and extends substantially upward from the base plate 1. A movable member 3 is mounted on the shaft 2 for rotation about the shaft 2. The movable member 3 carries a mirror frame 4 which may be made of a plastic material. A reflector or mirror 5 is mounted on the mirror frame 4. The movable member 3 is formed on its lower surface with a semispherical recess 10 and the base plate 1 is formed on its upper surface with a part-spherical recess 11. A rolling ball 6 is positioned in the recesses 10 and 11 to retain the movable member 3 in a predetermined position.

A stationary gear 7 is mounted on the shaft 2 and secured thereto by having the gear 7 engaged with a longitudinal groove 7a on the shaft 2. Between the gear 7 and the movable member 3, there is provided a coil spring 8 which functions to urge the gear 7 upwards. A retaining ring 9 is provided on the shaft 2 to hold the gear 7 in the vertical direction. It will therefore be understood that the movable member 3 is forced by the spring 8 downwards toward the base plate 1 to ensure engagement between the ball 6 and the recesses 10 and 11. When the movable member 3 is driven by a force which is sufficient to overcome the retaining force provided by the spring 9, the ball 6 rides over the recess 11 on the upper surface of the base plate 3.

The movable member 3 is provided with a shaft 13 which extends in parallel with the shaft 2 on the base plate 1. The shaft 13 carries a gear 12 which is rotatably mounted on the shaft 13 and engaged with the gear 7. An internal gear 14 is provided and securely mounted on the shaft 13. The internal gear 14 is held in contact with the gear 12 with an intervention of a low friction disc 15. The shaft 13 further has a main friction disc 16 which is secured to the shaft 13 at a portion opposite to the low friction disc 15 with respect to the gear 12. The main friction disc 16 and the low friction disc 15 are maintained in contact with the gear 12 under a controlled contact pressure which is applied thereto by a disc spring 17. The disc spring 17 is forced against the main friction disc 16 by a nut 19 through a nonreturn washer 18. It will therefore be understood that the gear 12 and the internal gear 14 are engaged with each other with a prdetermined friction force. When a driving force is applied to such an extent that the friction force is overcome by the driving force, the gear 12 can be rotated with respect to the internal gear 14.

On the movable member 3, there is mounted a driving motor 20 which has an output shaft provided with a worm 21. A worm wheel 22 is provided to engage the worm 21 on the output shaft of the motor 20. The worm wheel 22 is rotatably carried on a third shaft 24 which is also extending in parallel with the shaft 2 on the base plate 1. A gear 23 is formed integrally with the worm wheel 22 and engaged with a gear 25. The gear 25 is formed with a gear shaft 26 which is formed with an offset axial bore 26a which is rotatably engaged with a lower portion of the shaft 13.

Figure 4:
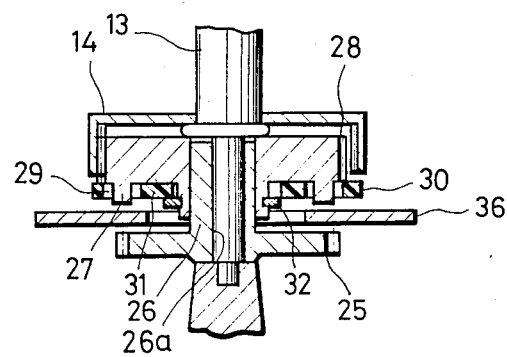
FIG. 4 is a sectional view taken along the line IV—IV in FIG. 2.
Figure 7:
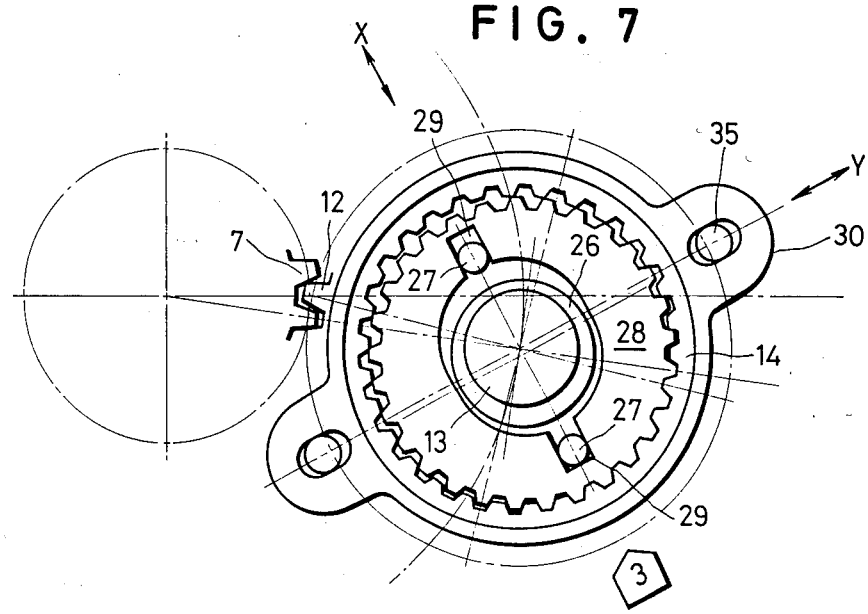
Figure 8:
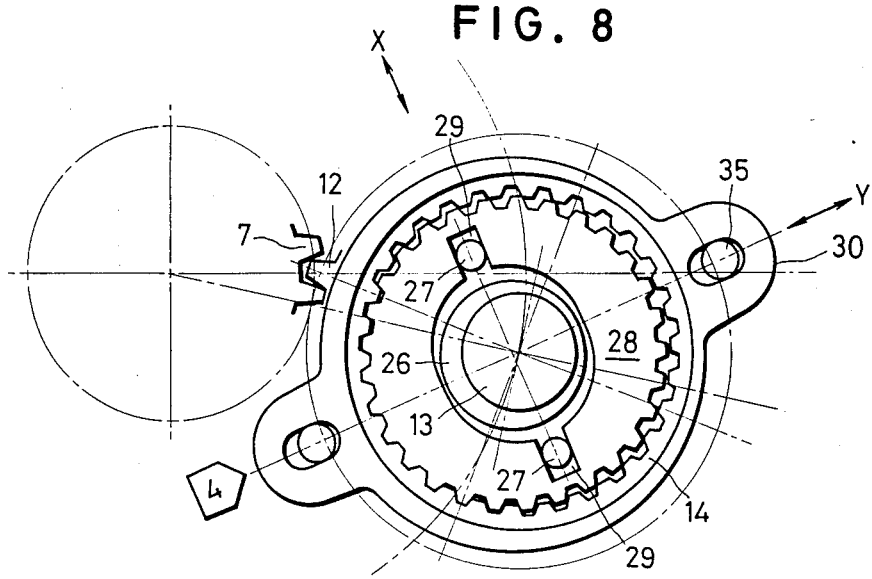

The gear shaft 26 carries an offset gear 28 which is rotatable on the gear shaft 26 and engaged with the internal gear 14. As shown in FIG. 4, the gear 28 is formed at the lower surface with a pair of projections 27 which are located at diametrically opposite positions. A slide plate 30 is provided on the gear 28 and slidably retained thereon by a retaining ring 32. The slide plate 30 has a pair of radially extending slots 29 which are engaged with the projections 27 on the gear 28. It will therefore be understood that the slide plate 30 is slidable with respect to the gear 28 in the radial direction but rotates as a unit with the gear 28.

Figure 3:
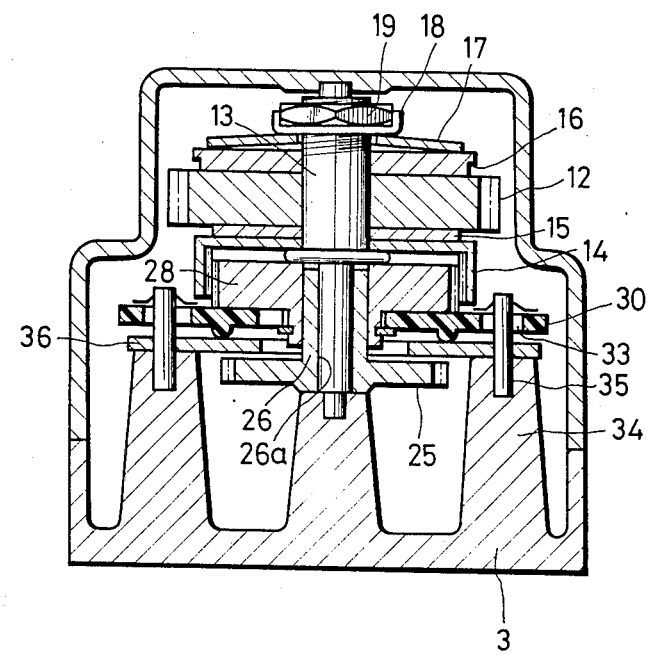
FIG. 3 is a sectional view taken substantially along the line III—III in FIG. 2.

The slide plate 30 further has radially extending slots 33 which are engaged with pins 35 provided on a boss portion 34 of the movable member 3 as shown in FIG. 3. A bearing or intermediate plate 36 is provided on the boss portion 34 of the movable member 3 and retained in position by the pins 35. The slide plate 30 slidably moves on the bearing plate 36.

In operation, the worm 21 on the output shaft of the drive motor 20 drives the worm wheel 22 and the gear 23 which is integral with the worm wheel 22. The gear 23 then drives the gear 25 which eccentrically supports the offset gear 28. As the gear shaft 26 rotates, the point of engagement of the offset gear 28 with the ring gear 14 moves circumferentially as shown sequentially in FIG. 5 through 8. Since the offset gear 28 has a number of gear teeth which is smaller than that of the internal gear 14 by one so that a relative rotation of the ring gear 14 is produced with respect to the offset gear 28. The driving force on the ring gear 14 is then applied to the gear 12 through the friction mechanism comprised of the friction discs 15 and 16 so that the gear 12 is rotated about the stationary gear 7 on the shaft 2. Thus, the movable member 3 and the mirror frame 4 thereon are rotated.

Figure 9:
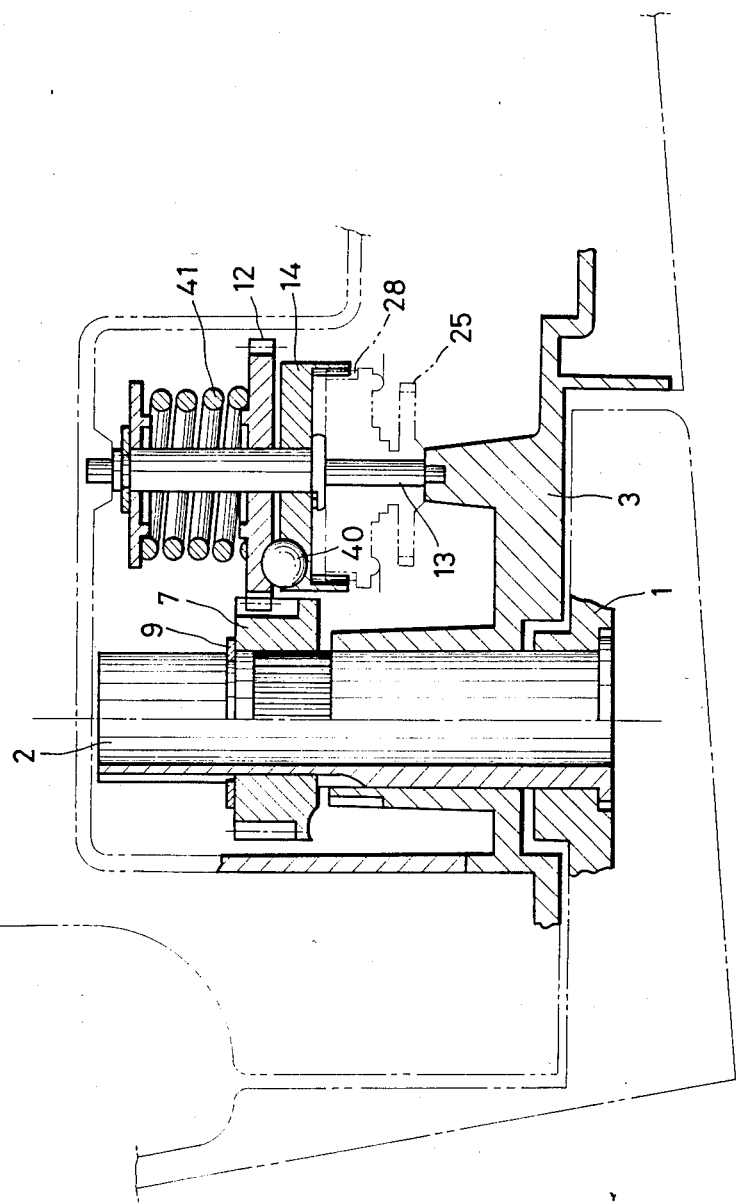
FIG. 9 is a sectional view showing another embodiment of the present invention.
Figure 10:
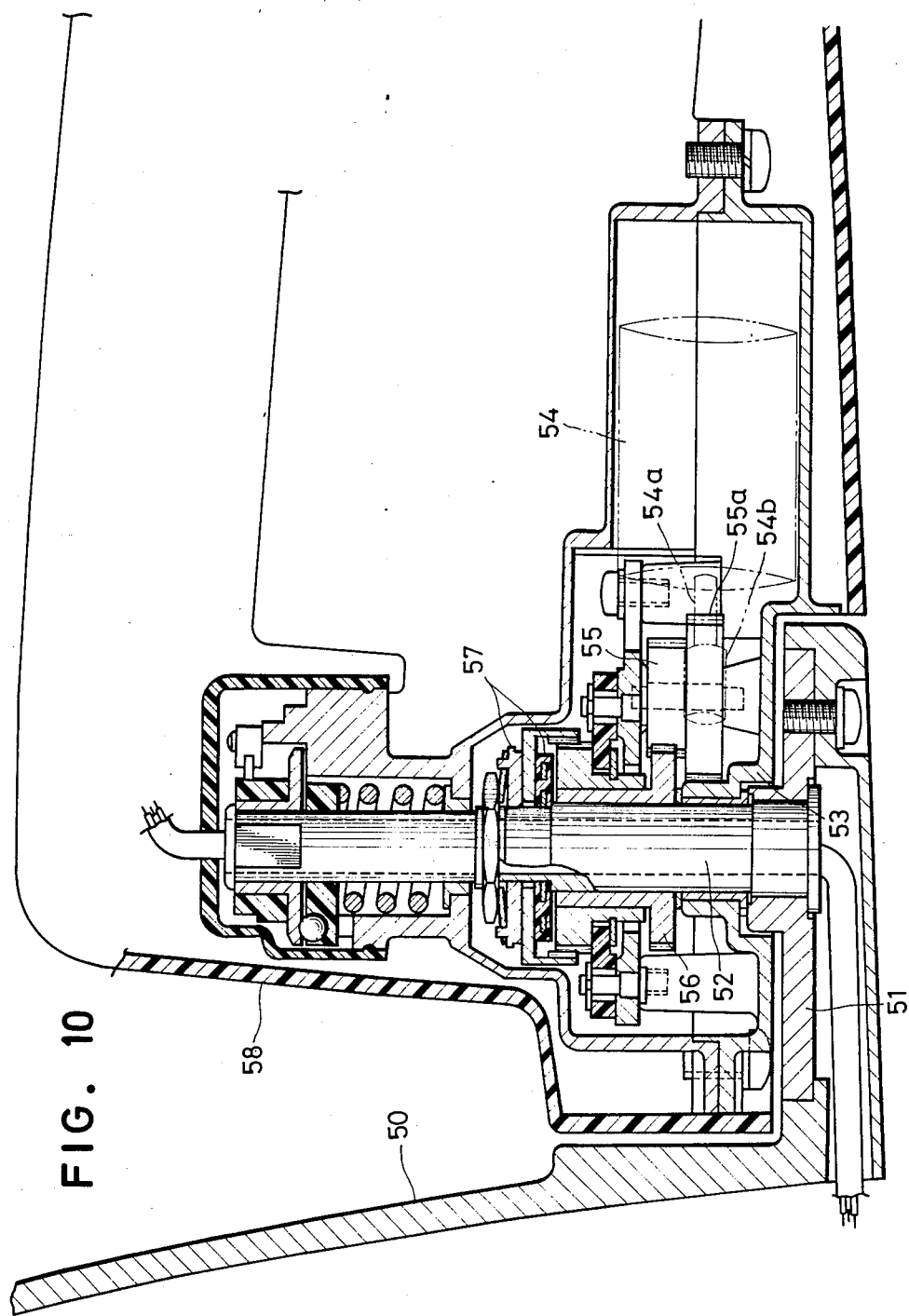
FIG. 10 is a sectional view similar to FIG. 1 but showing an example of a related structure; and, FIG. 11 is a diagram showing the change in the operating force in the related structure.

Referring now to FIG. 9, there is shown another embodiment of the present invention. In this embodiment, a ball-detent mechanism 40 is provided between the internal gear 14 and the gear 12. A compresion coil spring 41 is provided to bias the gear 12 toward the internal gear 14. It will be understood that with this mechanism the internal gear 14 is rotated with respect to the gear 12 when the driving torque is increased beyond a predetermined value.

The invention has thus been shown and described with reference to specific embodiments, however, it should be noted that the invention is in no way limited to the details of the illustrated structures by changes and modifications may be made without departing from the scope of the appended claims.

We claim:

1. An electrically operated automobile mirror assembly including a first shaft fixed to an automobile body, a movable member mounted on said first shaft for rotation about said shaft and carrying a reflector, stationary gear means secured to said first shaft, motor means mounted on the movable member and having output means, means for connecting said output means of the motor means through the stationary gear with said movable member, said connecting means including speed reduction gear means and friction means, said reduction gear means including a rotatable gear mounted on a second shaft provided on the movable member, said rotatable gear being in meshing engagement with said stationary gear on the first shaft, a planetary gear unit having a first element connected with said output means of the motor means and a second element engaged through said friction means with said rotatable gear.

2. An electrically operated automobile mirror assembly including a first shaft fixed to an automobile body, a movable member mounted on said first shaft for rotation about said shaft and carrying a reflector, stationary gear means secured to said first shaft, motor means mounted on the movable member and having output means, means for connecting said output means of the motor means through the stationary gear with said movable member, said connecting means including speed reduction means and torque limiting means for limiting a torque transmitted through said connecting means, said reduction gear means including a rotatable gear mounted on a second shaft provided on the movable member, said rotatable gear being in meshing engagement with said stationary gear on the first shaft, a planetary gear unit having a first element connected with said output means of the motor means and a second element engaged through said torque limiting means with said rotatable gear.

3. An electrically operated automobile mirror assembly including a first shaft fixed to an automobile body, a movable member mounted on said first shaft for rotation about said shaft and carrying a reflector, stationary gear means secured to said first shaft, motor means mounted on the movable member and having output means, means for connecting said output means of the motor means through the stationary gear with said movable member, said connecting means including speed reduction means and torque limiting means for limiting a torque transmitted through said connecting means, said reduction gear means including a rotatable gear mounted on a second shaft provided on the movable member, said rotatable gear being in meshing engagement with said stationary gear on the first shaft, a speed reduction gear unit having a first element connected with said output means of the motor means and a second element engaged through said torque limiting means with said rotatable gear.

4. An automobile mirror assembly in accordance with claim 3, wherein said second element of said speed reduction gear unit includes an internally threaded ring gear which is connected with said rotatable gear through said torque limiting means, and wherein said first element of said speed reduction gear unit includes an offset gear which is offset from said ring gear and engaged with the ring gear at a circumferential position, said offset gear being connected with said output means of the motor means.

5. An automobile mirror assembly in accordance with claim 3 in which said torque limiting means includes friction means provided between said second element of the speed reduction gear unit and said rotatable gear.

6. An automobile mirror assembly in accordance with claim 3 in which said torque limiting means includes ball-detent means provided between said second element of the speed reduction gear unit and said rotatable gear and resilient means for biasing said rotatable gear toward said second element of the speed reduction gear unit.

7. An automobile mirror assembly in accordance with claim 1 wherein said first shaft is mounted on a base plate securely mounted on the automobile body.

8. An automobile mirror assembly in accordance with claim 3, wherein said second element of the speed reduction gear unit is an internal gear having gear teeth and wherein said first element of the speed reduction gear unit is an offset gear which is offset from the internal gear and engaged with the internal gear at one circumferential position, said offset gear having gear teeth which are smaller in number than the gear teeth in the internal gear.

9. An automobile mirror assembly in accordance with claim 4 wherein said offset gear has gear teeth which are smaller in number than gear teeth in the ring gear.

10. An automobile mirror assembly in accordance with claim 1, wherein said friction means includes a friction disc engaged with the rotatable gear of the speed reduction means under a resilient force.

* * * * *